United States Patent Office 3,417,148
Patented Dec. 17, 1968

3,417,148
ALKYLATION PROCESS
Norman A. Fishel, Lansing, Mich., assignor to Universal Oil Products Company, Des Plaines, Ill., a corporation of Delaware
No Drawing. Filed June 30, 1967, Ser. No. 650,248
10 Claims. (Cl. 260—671)

ABSTRACT OF THE DISCLOSURE

An alkylatable aromatic compound is alkylated with an olefin-acting compound utilizing a catalyst comprising a crystalline aluminosilicate chemically combined with a metal subfluoride vapor.

---

This invention relates to a conversion process for the alkylation of alkylatable aromatic compounds into more useful compounds. More specifically, this invention is concerned with a conversion process for the alkylation of an alkylatable aromatic compound with an olefin acting compound utilizing a novel catalyst comprising a crystalline aluminosilicate chemically combined with a metal subfluoride vapor.

It is therefore an object of this invention to provide a process for the alkylation of alkylatable aromatic compounds utilizing a novel alkylation catalyst.

A specific object of this invention is to provide a novel method and a novel catalyst for alkylating alkylatable aromatic compounds to provide the desired alkylated product in high yields.

One embodiment of the invention relates to a conversion process which comprises alkylating an alkylatable aromatic compound at a temperature in the range of from about 0° to about 450° C. and a pressure in the range of from about atmospheric to about 200 atmospheres in contact with a catalyst comprising a crystalline aluminosilicate chemically combined with a metal subfluoride vapor.

Other objects and embodiments referring to alternative alkylatable aromatic compounds and to alternative catalytic compositions of matter will be found in the following further detailed description of the invention.

The process of my invention is applicable to the alkylation of alkylatable aromatic compounds including, for example benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, diethylbenzene, triethylbenzene, normal propylbenzene, isopropylbenzene, etc. and mixtures thereof. Preferred alkylatable aromatic compounds are the monocyclic aromatic hydrocarbons, that is, the benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc. Very often, alkylate is obtained as a high boiling fraction in which the alkyl group attached to the aromatic nucleus varies in size from about $C_9$ to $C_{18}$. Other suitable aromatic hydrocarbons, which are specified conditions, depending upon the melting point of the aromatic chosen, would be in liquid form, would include those aromatic hydrocarbons with two or more aryl groups such as diphenyl, diphenylmethane, triphenyl, triphenylmethane, fluorene, stilbene etc. Examples of other aromatic hydrocarbons utilizable within the scope of this invention at specified alkylation conditions, depending upon melting point of the aromatic chosen, would be in liquid form, including those containing condensed aromatic rings. These include naphthalene, alkyl naphthalenes, anthracene, phenanthrene, naphthacene, rubrene, etc. Of the above-mentioned aromatic hydrocarbons that could be utilized in the process of this invention, the benzene hydrocarbons are preferred, and of the preferred benzene hydrocarbons, benzene itself is particularly preferred.

The olefin-acting compound, acting as the alkylating agent, may be selected from diverse materials including monoolefins, diolefins, polyolefins, acetylenic hydrocarcarbons, and also alcohols, ethers, and esters, the latter including alkyl halides, alkyl sulfates, alkyl phosphates, and various esters of carboxylic acid. The preferred olefin-acting compounds are olefinic hydrocarbons which comprise monoolefins containing one double bond per molecule and polyolefins which contain more than one double bond per molecule. Monoolefins which are utilized as olefin-acting compounds in the process of the present invention are either normally gaseous or normally liquid and include ethylene, propylene, 1-butene, 2-butene, isobutylene, and higher molecular weight normally liquid olefins such as the various pentenes, hexenes, heptenes, octenes, and mixtures thereof, and still higher molecular weight liquid olefins, the latter including various olefin polymers having from about 9 to about 18 carbon atoms per molecule including propylene trimer, propylene tetramer, propylene pentamer, etc. Cycloolefins such as cyclopentene, methylcyclopentene, cyclohexene, methylcyclohexene, etc. may be utilized. Also included within the scope of the olefin-acting compound are certain substances capable of producing olefinic hydrocarbons or intermediates thereof under the conditions of operating utilized in the process. Typical olefin-producing substances or olefin-acting compounds capable of use include alkyl halides capable of undergoing dehydrohalogenation to form olefinic hydrocarbons and thus containing at least two carbon atoms per molecule. Examples of such alkyl halides include ethyl fluoride, n-propyl fluoride, tert-butyl fluoride, etc., ethyl chloride, n-propyl chloride, isopropyl chloride, n-butyl chloride, isobutyl chloride, sec-butyl chloride, tert-butyl chloride, etc., ethyl bromide, n-propyl bromide, isopropyl bromide, n-butyl bromide, isobutyl bromide, sec-butyl bromide, tert-butyl bromide, etc. As stated hereinabove, other esters such as alkyl sulfates including ethyl sulfate, propyl sulfates, etc., and alkyl phosphates including ethyl phosphates, etc. may also be utilized. Ethers such as diethyl ether, ethyl propyl ether, dipropyl ether, etc. are also included within the generally broad scope of the term olefin-acting compound and may be successfully utilized as alkylating agents in the process of this invention.

In addition, the process of this invention may be successfully applied to and utilized for complete conversion of olefin hydrocarbons when these olefin hydrocarbons are present in minor quantities in various gas streams. Thus, the normally gaseous olefin for use in the process of this invention need not be concentrated. Such normally gaseous olefin hydrocarbons appear in minor quantities in various refinery gas streams, usually diluted with gases such as hydrogen, nitrogen, methane, ethane, propane, etc. These gas streams containing minor quantities of olefin hydrocarbons are obtained in petroleum refineries from various refinery installations including thermal cracking units, catalytic cracking units, thermal reforming units, coking units, polymerization units, dehydrogenation units, etc. Such refinery gas streams have in the past often been burned for fuel value, since an economical process for the utilization of their olefin hydrocarbon content has not been available. This is particularly true for refinery gas streams known as off-gas streams containing relatively minor quantities of olefin hydrocarbons such as ethylene, propylene, etc.

As hereinbefore set forth, the invention is concerned with a process for the alkylation of alkylatable aromatic compounds, said process being effected in the presence of a catalyst which possesses a high degree of hydrocarbon conversion activity and is particularly effective as an alkylation catalyst for alkylatable aromatic compounds. The catalyst comprises a crystalline aluminosilicate combined with a metal subfluoride vapor. The crystalline aluminosilicates are composed of $SiO_4$ and $AlO_4$ tetrahedra, a silicon or aluminum atom being centered around four oxygen atoms in the tetrahedra and the oxygen being shared with other surrounding tetrahedra. These aluminosilicates are geometrically arranged to form a pore structure having sufficiently large pore size to permit the reactant molecules to pass into said pore structure. Preferably, the aluminosilicates employed in the catalyst support have pore sizes from about 4 up to about 15 angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalytic activity of the aluminosilicates is to ion-exchange with ammonium ions followed by thermal treatment, preferably about 300° C. to convert the crystalline aluminosilicates to the hydrogen form.

There are numerous types of crystalline aluminosilicates, both synthetic and natural occurring. It is preferable that the pore mouths of the crystalline aluminosilicates have cross-sectional diameters of from about 4 to 15 angstrom units. Among the preferable crystalline aluminosilicates that are suitable are the hydrogen and/or polyvalent forms of faujasite, and mordenite, and especially preferable is the hydrogen form of mordenite.

The concentration of crystalline aluminosilicate may be as high as 100% or the crystalline aluminosilicate may be held within a matrix which may be selected from the group consisting of silica, alumina, and silica-alumina mixtures.

As set forth hereinabove, the catalyst comprises a crystalline aluminosilicate that is combined with a metal subfluoride vapor to effect combination of the crystalline aluminosilicate with the metal subfluoride. Particularly preferred metal subfluorides include the aluminum subfluorides including aluminum monofluoride and silicon subfluorides including silicon difluoride due mainly to the relative ease in preparing these compounds although the invention is not restricted to their use but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

The catalyst of the present invention comprises a crystalline aluminosilicate combined with the metal subfluoride vapor so as to effect combination of the crystalline aluminosilicate with the metal subfluoride vapor and it is the particular association of these components which results in the unusual catalytic properties of this catalyst. The metal subfluorides vapor may be combined with the crystalline aluminosilicate at temperatures in the range of 650° C. to about 1000° C. and at a pressure of from about subatmospheric to about 10 atmospheres. The formation of the metal subfluoride vapor, and especially the formation of aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 850° C. The crystalline aluminosilicate which is then chemically combined with the aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the crystalline aluminosilicate catalyst support and then heating in vacuum in a furnace tube at elevated temperatures.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the alkylatable aromatic compound and the olefin-acting compound are continuously charged to a reaction zone containing a fixed bed of the desired catalyst, said zone being maintained at the proper operating conditions of temperature and pressure, that is, a temperature in the range of from about 0° to about 450° C. or more and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from 0.1 to about 10, or at a gaseous hourly space velocity in the range of from about 100 to about 1500 or more. The reaction zone may comprise an unpacked vessel or coil or may be lined with an adsorbent packing material. The two reactants may be charged through separate lines or, if so desired, may be admixed prior to entry into said reaction zone and charged thereto in a single stream. This charge passes through the catalyst bed in an upward, downward, or radial flow and the alkylated product is continuously withdrawn, separated from the reactor effluent, and recovered, while any unreacted starting materials may be recycled to form a portion of the feed stock. It is also contemplated within the scope of this invention that gases such as nitrogen, argon, hydrogen, helium, etc., may also be charged to the reaction zone if desired. Another continuous type operation comprises the moving bed type in which the reactants and the catalyst bed move either concurrently or countercurrently to each other while passing through said reaction zone.

Still another type of operation which may be used is the batch type operation in which a quantity of the alkylatable aromatic hydrocarbon, the olefin-acting compound and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are introduced for the purpose of illustration only with no intention of unduly limiting the generally broad scope of the present invention.

Example I

A quartz vessel with provisions for connection to a vacuum system was filled with a mixture of about 94 grams of a 5A crystalline aluminosilicate having a 2:1 silica to alumina mol ratio and about 26 grams of ⅛ inch pellets comprising about 20% aluminum metal and about 80% aluminum trifluoride by weight. The contents of the vessel were outgassed at a pressure of less than $10^{-4}$ mm. while slowly being heated in a tube furnace. Approximately 4½ hours were allowed for the system to reach 600 to about 650° C. The evacuated vessel was then sealed off. The vessel was then placed in a muffle furnace at 750° C. for 1 hour and rotating slowly to aid mixing.

The sealed vessel was cooled to room temperature. After cooling, the vessel was opened in a helium dry box, the somewhat greyish catalyst spheres were separated from the pellets and the catalyst was then placed in vessels which were then sealed. This catalyst is designated as catalyst A.

Example II

In this example, a volatile fluoride (800° C.) is prepared by sweeping with helium a stoichiometric mixture of aluminum metal (melting point 660° C.) and aluminum trifluoride (melting point greater than 1000° C.) which is heated to 750-800° C. Aluminum monofluoride is then produced. A catalyst base in the form of hydrogen form faujasite ⅛ inch diameter pills is then placed in the downstream helium flow and the aluminum monofluoride is chemically combined with the base at a temperature in excess of 650° C.

The catalyst produced by this vapor deposition and chemical combination of the aluminum monofluoride with the hydrogen form faujasite has fluoride levels of less than 5 percent by weight fluoride chemically combined therewith. This catalyst is designated as catalyst B.

Example III

A volatile fluoride (800° C.) is prepared by sweeping with helium a stoichiometric mixture of aluminum metal (melting point 660° C.) and aluminum trifluoride (melting point greater than 1000° C.) which is heated to 750-800° C. Aluminum monofluoride is then produced. A catalyst base in the form of hydrogen form mordenite 1/16 inch diameter spheres is prepared and placed in the downstream helium flow and the aluminum monofluoride is chemically combined with the base at a temperature in excess of 650° C.

The catalyst produced by this vapor deposition and chemical combination of the aluminum monofluoride with the hydrogen form mordenite has fluoride levels of less than 5 weight percent of fluoride chemically combined therewith. This catalyst is designated as catalyst C.

Example IV

The catalyst prepared according to Example I above and designated as catalyst A is utilized in an alkylation reaction to determine the alkylation activity of said catalyst. In this experiment, a portion of the catalyst prepared according to the method of Example I is placed in an appropriate apparatus which is provided with heating means. In the experiment, benzene and ethylene are charged separately to the alkylation reaction zone. The reactor is maintained at about 500 p.s.i.g. and 125° C. Substantial conversion of the ethylene is obtained. The product is analyzed for olefins using a mass spectrometer and it is found that the product comprises ethylbenzene, diethylbenzene, polyethylbenzenes and unreacted benzene.

Example V

The catalyst prepared according to Example II and designated as catalyst B is utilized in the alkylation reaction zone, a portion of the finished catalyst being placed in the alkylation apparatus. In the experiment, benzene and ethylene are charged separately to the alkylation zone which is maintained at about 500 p.s.i.g and 150° C. Based on weight, substantial conversion of the ethylene is obtained. The product is analyzed for olefins using a mass spectrometer and it is found that the product comprises ethylbenzene, diethylbenzene, polyethylbenzenes and unreacted benzene.

Example VI

A portion of the catalyst prepared according to Example III and designated as catalyst C is utilized in an alkylation reaction, the finished catalyst being placed in the alkylation apparatus. In the experiment, benzene and propylene are charged separately to the alkylation zone. The reactor is maintained at about 400 p.s.i.g. and 155° C. Substantial conversion of the propylene is obtained. The product is analyzed for olefins using a mass spectrometer and it is found that the product comprises cumene, diisopropylbenzene, polypropylbenzenes and unreacted benzene.

Example VII

A second portion of the catalyst prepared according to Example III above and designated as catalyst C is utilized in the alkylation of benzene wtih a synthetic refinery off-gas similar to that normally observed from a catalyst cracking unit. A fresh batch of the catalyst is placed in an alkylation reactor and the reactor is maintained at a temperature in the range of from about 110° C. to about 215° C. at a pressure of about 500 p.s.i.g. The composition of the synthetic off-gas feed is as follows: carbon dioxide, 0.1 mol percent; nitrogen, 29.0 percent; carbon monoxide, 1.3 mol percent; hydrogen, 18.9 mol percent; methane, 35.0 mol percent; ethylene, 12.0 mol percent; ethane, 0.5 mol percent; propylene, 2.5 mol percent; propane, 0.1 percent; isobutane, 0.1 mol percent; and acetylene, 0.5 mol percent. The off-gas and benzene are charged separately to the alkylation zone. The plant liquid effluent is tested for unsaturation and is found to have a low bromine index indicating the substantial absence of olefin polymerization products. The product comprises ethylbenzene, diethylbenzene, polyethylbenzenes, cumene, diisopropylbenzene, polypropylbenzenes and 1,1-diphenylethane.

I claim as my invention:

1. A conversion process which comprises alkylating an alkylatable aromatic compound with an olefin-acting compound at a temperature in the range of from about 0° to about 450° C. and at a pressure in the range of from about atmospheric to about 200 atmospheres in contact with a catalyst comprising a crystalline aluminosilicate chemically combined with a metal subfluoride vapor.

2. The process of claim 1 further characterized in that said metal subfluoride is aluminum monofluoride and that said crystalline aluminosilicate contains silica and alumina tetrahedra having uniform pores of between 4 and 5 angstroms.

3. The process of claim 2 further characterized in that said silica and alumina tetrahedra having uniform pores of between 4 and 15 angstroms are suspended in an alumina matrix.

4. The process of claim 2 further characterized in that said silica and alumina tetrahedra having uniform pores of between 4 and 15 angstroms are suspended in a silica matrix.

5. The process of claim 2 further characterized in that said silica and alumina tetrahedra having uniform pores of between 4 and 15 angstroms are suspended in a silica-alumina matrix.

6. The process of claim 2 further characterized in that said crystalline aluminosilicate is the hydrogen form of faujasite.

7. The process of claim 2 further characterized in that said crystalline aluminosilicate is the hydrogen form of mordenite.

8. The process of claim 2 further characterized in that said alkylatable aromatic compound is an alkylatable benzene hydrocarbon and that said olefin-acting compound is an olefinic hydrocarbon.

9. The process of claim 8 further characterized in that said alkylatable benzene hydrocarbon is benzene and that said olefinic hydrocarbon is a normally gaseous olefin.

10. The process of claim 8 further characterized in that said alkylatable benzene hydrocarbon is benzene and that said olefinic hydrocarbon is ethylene.

References Cited

UNITED STATES PATENTS

| | | | |
|---|---|---|---|
| 2,904,607 | 9/1959 | Mattox et al. | 260—671 |
| 2,930,819 | 3/1960 | Aries | 260—671 |
| 2,965,686 | 12/1960 | Prill | 260—670 |

DELBERT E. GANTZ, *Primary Examiner.*

C. R. DAVIS, *Assistant Examiner.*